United States Patent

[11] 3,587,322

| [72] | Inventors | Stephen L. Lobdell<br>Springfield, Vt.;<br>Ralph S. Gamble, Chester, Vt. |
|---|---|---|
| [21] | Appl. No. | 834,112 |
| [22] | Filed | June 17, 1969 |
| [45] | Patented | June 28, 1971 |
| [73] | Assignee | Simmonds Precision Products, Inc.,<br>Tarrytown, N.Y. |

[54] PRESSURE TRANSDUCER MOUNTING
4 Claims, 1 Drawing Fig.

[52] U.S. Cl. .................................................. 73/420,
73/398
[51] Int. Cl. .............................................. G01l 7/08
[50] Field of Search ............................................73/420, 398
(R) (Cursory), 420

[56] References Cited
UNITED STATES PATENTS

| 1,148,361 | 7/1915 | Coxe ............................. | 73/420X |
| 2,629,801 | 2/1953 | Warshaw ........................ | 73/398(R) |
| 3,247,719 | 4/1966 | Chelner ......................... | 73/420 |

Primary Examiner—Louis R. Prince
Assistant Examiner—Daniel M. Yasich
Attorney—Edwin E. Greigg ABSTRACT: A mechanical mounting package for a pressure transducer utilizing a pressuretight housing for enclosing a transducer and exposing only its torquing surface. The transducer is supported such that it is mechanically isolated from environmental effects.

PATENTED JUN28 1971
3,587,322
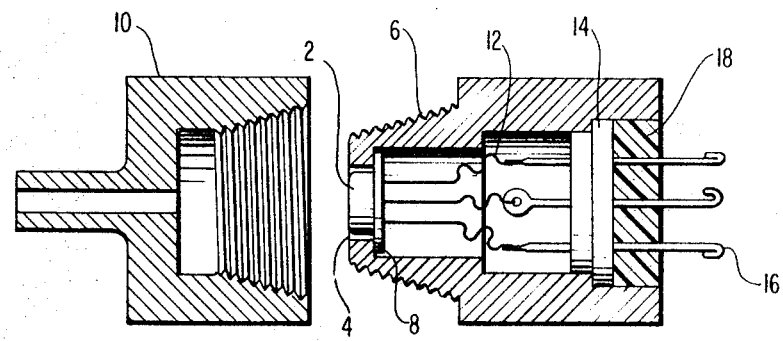
INVENTORS
STEPHEN L. LOBDELL
RALPH S. GAMBLE
BY Edwin E. Greigg
ATTORNEY

PRESSURE TRANSDUCER MOUNTING

This invention relates to a mechanical mounting package for sensitive electronic transducer modules and, more particularly, to a mounting package for a pressure-sensitive transducer in order to provide interface operation, mechanical isolation, electrical and environmental isolation, and physical protection to the transducer during handling, installation and operation.

It has been a longstanding problem to provide adequate physical protection for delicate electronic transducer modules, particularly pressure-sensitive transducers during handling, installation and operation.

The mechanical sensitivity of a pressure-sensitive transducer must be safeguarded from the time the transducer is assembled at the factory and, accordingly, it is the purpose of this invention to provide a unique design of a package which will provide functional performance to the transducer while utilizing simple and reliable installation and usage techniques.

Accordingly, it is an object of this invention to provide a pressure-sensitive transducer mounting package which provides protection to the unit during normal handling, installation and usage.

Another object of this invention is to provide a mounting package for pressure-sensitive transducers and other delicate electronic transducer devices which will provide environmental isolation and physical protection to the transducer during handling, installation and operation.

It is another object of this invention to provide a mechanical mounting package for a pressure-sensitive transducer which serves to enclose the transducer but mechanically isolates the same as well as provides electrical and environmental isolation and physical protection to the transducer during handling, installation and operation.

According to one embodiment employing the principles of this invention, there is provided a pressure-sensitive transducer mounted in a pressuretight housing in which the transducer is mechanically isolated from the housing by a nonhardening adhesive to dampen environmental effects of the installation. The transducer electrical leads are connected to an electrical header member or receptacle which provides external electrical connection to system components. The header member is sealed within the housing which provides environmental isolation to the rear of the pressure transducer. The torquing surface of the transducer lies flush with the open portion of the housing such as to present a flat surface in the same plane as the end face of the housing.

Other objects and advantages will become apparent from a detailed study of the following specification and drawing in which there is shown a side elevational view of the housing mounting the pressure-sensitive transducer according to the principles of this invention.

Referring now to the drawing, a pressure-sensitive transducer or some such other sensitive electronic module 2 is shown to be fitted within an aperture 4 of an end face of the housing 6. The transducer 2 is secured to the inside of the aperture 4 by a surrounding rim of nonhardening adhesive material 8 which serves to mechanically isolate the transducer from the housing 6 and to dampen the environmental effects of the installation with which the assembly may be used. The front end of the housing 6 is provided with suitable mounting threads which may be secured to a suitable installation. An adapter 10 may be provided, however, for furnishing the interface mounting to existing requirements, that is, when it is desired to use the pressure transducer within a smaller aperture and not defined by the diameter of the housing 6. The adapter 10, of course, would be secured to the front end of the housing 6 by the mounting threads provided thereon.

Extending from the rear of the transducer 2 are shown a plurality of electrical leads which are connected to a set of flexible conductors 12 extending from an electrical header or receptacle member 14 which provides external electrical connections 16 to suitable system components. The header member 14 is secured within the interior of the housing 6 at its rear portion and is suitably sealed in the housing with an adhesive sealant or putty compound 18 as well known in the art which provides environmental isolation to the rear of the transducer 2.

It is contemplated that the transducer member 2 be fitted within such a housing as provided according to the principles of this invention at the time the transducer is constructed and thus the transducer will be protected during subsequent handling as well as during installation of the transducer with a suitable system. The housing 6, by means of its threaded mounting of the forward end thereof, may be quickly secured to a suitable aperture within which the transducer is to operate. Various adapters such as shown at 10, may be additionally provided with varying neck diameters for use with different size apertures in various installations. Once the transducer is mounted, the electrical connector 16 can be quickly attached to suitable component systems.

It will be seen that with the provision of a housing 6 for sensitive electronic transducers, particularly pressure-sensitive transducers, a simple and reliable mechanical mounting package can be provided for quick interface operation for the transducer as well as providing mechanical isolation, electrical connection, environmental isolation and physical protection to the transducer during handling, installation and operation.

We claim:

1. In a mounting package for a transducer module comprising a hollow housing having spaced open ends, a strain guage transducer positioned in one of said open ends and forming therewith an annular space surrounding said transducer having a pliable nonhardening adhesive material connecting said transducer to said housing and closing said annular space, said pliable adhesive material serving to mechanically isolate the transducer from the housing and dampen the environmental effect of its installation, an electrical connector means positioned adjacent said other open end, and a sealing means for supporting said electrical connector means.

2. A mounting package for a transducer device comprising a hollow housing having spaced open ends, one of said open ends having a lip portion defining an aperture, a flat surface adjacent to said aperture, a strain guage transducer positioned in said aperture, said transducer including a flat rear surface coplanar with said flat surface, a pliable nonhardening adhesive means connecting said transducer to said lip portion and forming a plate covering said flat surfaces, an electrical connector means positioned in said other open end, and a sealing means for supporting said electrical connector means.

3. A mounting package for a transducer comprising a hollow housing having spaced open ends, one open end of said housing having a lip portion defining an aperture, said hollow housing being threaded on its exterior surface adjacent said one open end, a strain gauge transducer positioned in said aperture, a pliable adhesive material connecting said transducer to said lip portion, said pliable nonhardening adhesive material serving to mechanically isolate the transducer from the housing and dampen the environmental effect of its installation, an electrical connector means positioned adjacent the other open end of said housing, and a sealing means for supporting said electrical connector means.

4. In a mounting package for a transducer having a hollow housing having spaced open ends, said housing having a lip portion at one of said open ends defining an aperture, a strain gauge transducer positioned in said aperture and having an exposed surface in the same plane as the face of said one open end, a pliable nonhardening adhesive material connecting said transducer to said lip portion, said pliable adhesive material serving to mechanically isolate the transducer from the housing and dampen the environmental effect of its installation, an electrical connector means positioned at the other open end of said housing, and a sealing means for supporting said electrical connector means.